R. W. A. BREWER & G. H. JONES.
CARBURETER.
APPLICATION FILED DEC. 16, 1912.

1,097,787.

Patented May 26, 1914.

3 SHEETS—SHEET 1.

Witnesses.

Inventors.
Robert W. A. Brewer
George H. Jones
per Albert H. Decker
Attorney

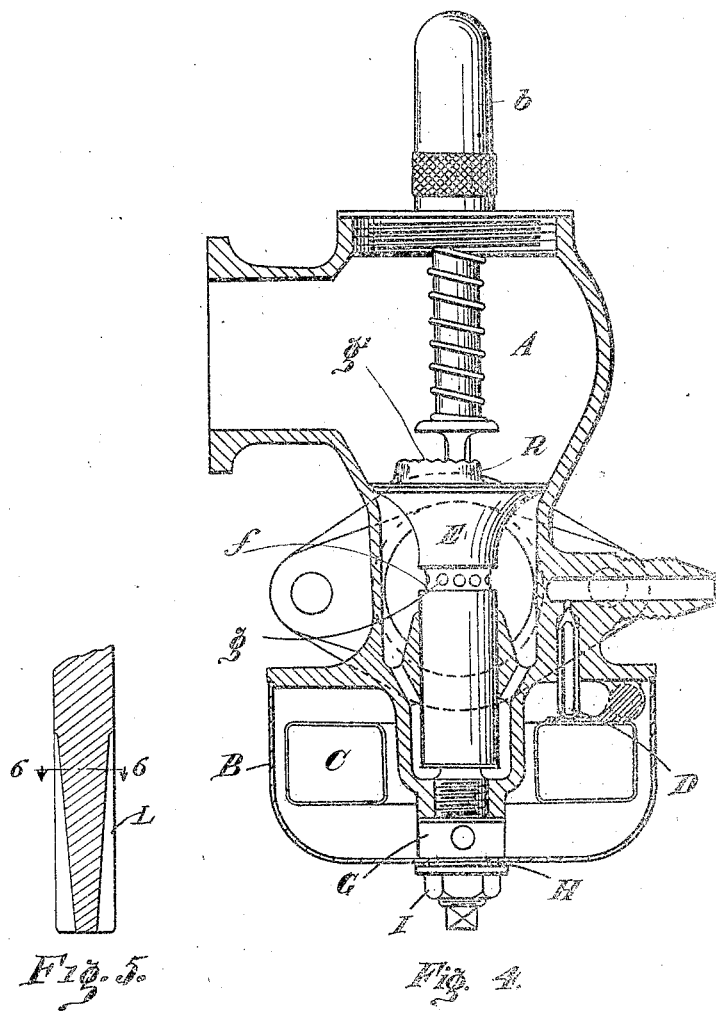

UNITED STATES PATENT OFFICE.

ROBERT WELLESLEY ANTONY BREWER AND GEORGE HERBERT JONES, OF LONDON, ENGLAND.

CARBURETER.

1,097,787. Specification of Letters Patent. Patented May 26, 1914.

Application filed December 16, 1912. Serial No. 737,080.

*To all whom it may concern:*

Be it known that we, ROBERT WELLESLEY ANTONY BREWER and GEORGE HERBERT JONES, engineers, residing at 199 Piccadilly, W., in the county of London, England, have invented certain new and useful Improvements in Carbureters for Internal-Combustion Engines and other Purposes, of which the following is a specification.

This invention relates to a carbureting device for regulating the flow of air and liquid fuel for use with an internal combustion engine or other similar apparatus.

The objects of our improvements are, first, to construct a carbureter of simple form which, when once properly adjusted, will supply a correctly proportioned gaseous mixture for all speeds of the engine; second, to provide that the flow of fuel is retarded under abnormal engine suction; and third, to prevent the possibility of air or fuel leakage into the mixing chamber with a minimum amount of accurate fitting of the parts.

The invention is concerned principally with the control of the fuel valve through the medium of a floating air valve, this being accomplished with the use of a hollow stem depending from the said air valve, in which stem is placed the fuel orifice and preliminary air supply; by this means we are enabled to employ an important principle, viz., that by creating a pressure near the fuel orifice, we retard the flow of fuel when the engine suction is abnormal, and wastage of fuel is thus prevented; if therefore the engine races, or other cause for an abnormal suction occurs the momentary enrichment of the mixture in the hollow stem causes a pressure—or rather reduces the negative pressure—and the suction on the fuel jet decreases.

The accompanying drawings illustrate the apparatus by which the objects named are attained, the same letters being used for similar parts in the several views.

Figure 1:
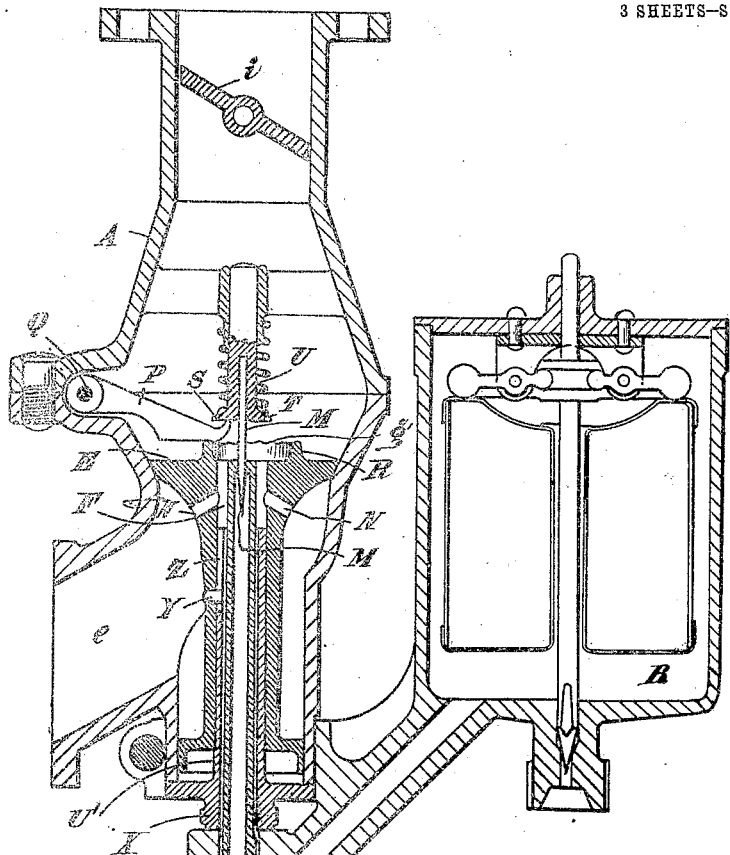
Figure 2:
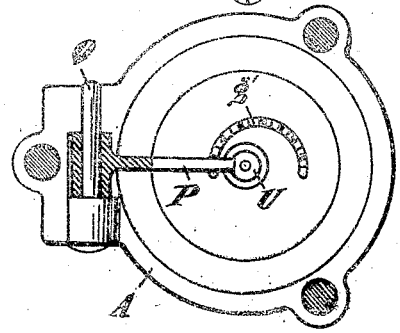
Figure 3:
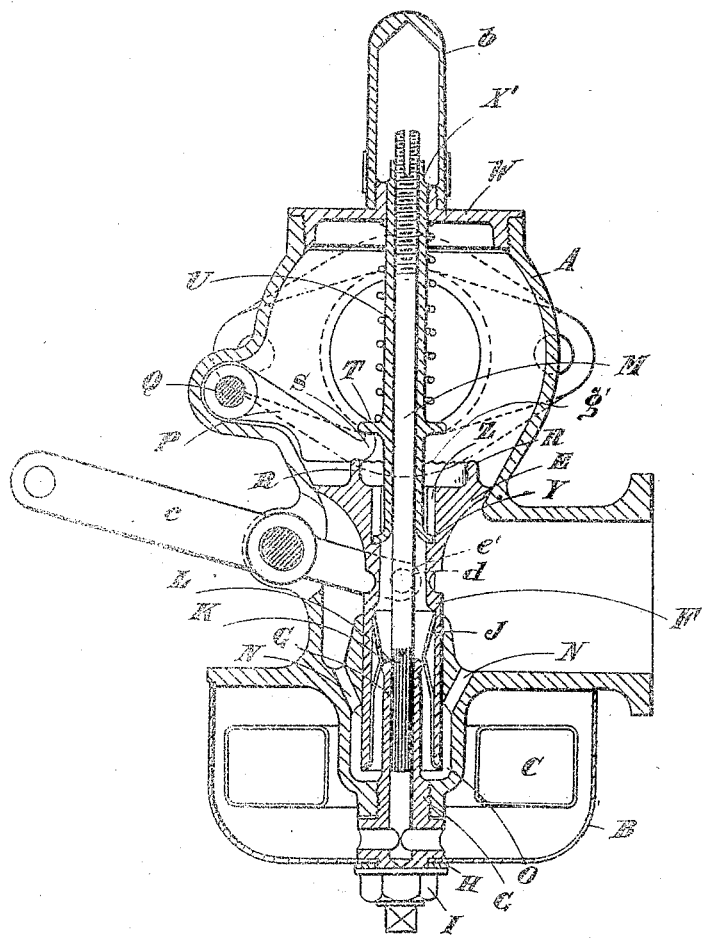

Figure 1 is a side view partly in section showing the complete carbureter; Fig. 2 is a plan of Fig. 1 with the throttle valve casing removed; Fig. 3 is a side view in section showing another form of the invention; Fig. 4 is a part cross section of Fig. 3; and Figs. 5 and 6 are section and plan respectively of the valve spindle shown in Fig. 3.

In all the drawings A represents the main casing and B a float chamber.

Referring first to Figs. 1 and 2, a main air valve E is fitted centrally of the casing A and has a hollow stem F. Projecting up the center of E is a fuel nozzle G and a needle valve M enters this at its upper end. By means of a hexagon nut $h$ on its lower end the seating on this fuel pipe can be adjusted to suit the needle, which is itself carried by a sleeve U working in a guide bearing, and terminating at its bottom end in a flange T which also acts as a deflector for the fuel coming out of the nozzle.

The pipe $e$ is for the introduction of air and a preliminary air supply enters through the holes N, N adjacent to the fuel orifice.

At Q is pivoted a lever P which bears on the ridge R on the valve E eccentrically placed as regards the needle valve; by means of the upturned toe S the lever P lifts the needle M when the valve E rises; thus when the suction of the engine increases the air valve E rises and not only does an increased amount of air enter the mixing chamber but also an increased amount of fuel owing to the corresponding rise of the needle M. Supposing this amount of fuel is not sufficient, it will be seen that by rotating the valve E the ridge R approaches nearer to the pivot Q and the leverage of P is increased, consequently the lift of the needle M is correspondingly increased. The serrations on the top of the ridge R serve to prevent accidental rotation of the valve E.

The rotation of the valve E is effected by the nut X which rotates the guide sleeve $U^1$ provided at its upper end with the slot Z; this slot allows of the pin Y fixed in the valve E rising and falling with the valve but causing the rotation of the valve when U is rotated.

A throttle valve $i$ may be provided, but by attaching a lever to raise the valve E by hand, this is rendered quite unnecessary.

In the form of the invention shown in Figs. 3 and 4, the needle valve M is replaced by a valve spindle having grooves L cut at its bottom end and formed of segmental section with less depth at the top than lower down, see Figs. 5 and 6; consequently as the spindle M rises, the area of the fuel orifice is increased.

G is a fuel nozzle which also supports the float chamber B by means of a joint H and a nut I. The external form of this nozzle G is such as to produce with the choke tube J a Venturi opening K for the passage of the primary air. By suitably designing the conical shape of the tube J and the external shape of the nozzle G, it will be seen that within operative limits the area of the annulus between the end of the nozzle G and the tube J can be smaller than the area of the annulus between the spindle M and the minimum bore of the choke tube, so that the air passage is always smallest immediately adjacent to the fuel nozzle. This is of advantage as the rush of air being greater, better mixing with the fuel spray is achieved. It is also of advantage because under abnormal suction the primary air supply through J does not increase to the same extent as the fuel supply from G, consequently a very rich mixture is formed within the tube F which tends to reduce the negative pressure therein, thus materially reducing the suction on the fuel orifice and the efflux of fuel, and so waste is prevented. The choke tube J can be varied as to the size of its throat until the minimum quantity of air necessary to give slow running is found for any size of engine. The choke tube J is pressed into and moves with the valve E and consequently as E rises, so the throat of the tube also rises above the nozzle G and in so doing the actual area around the enlarged external portion of the nozzle G is increased. This increment of area is accompanied by an increment of area of the fuel orifices L by reason of the fuel spindle M rising simultaneously.

The valve E need not be a good fit in the casing A around its stem as there is no tendency for leakage of air here, nor is there any requirement for a dashpot action but the necessary primary air can pass through holes N to a chamber O at the base of the valve E and the Venturi tube K.

The lift of the fuel needle M is imparted to it as before by means of the lever P pivoted at Q and motion is applied through the medium of the eccentric ridge or projection R.

It will be seen that by rotation of the valve E and the ridge R the point of contact of the ridge R can be varied with relation to the fulcrum Q and thus give a varied lift to the toe of the lever S acting upon the circular deflector plate T. The deflector plate T is formed on a sleeve U fitting over the fuel needle M and screwed to it at one end in such a manner that in the position of slow running when the valve E is on its seat, any required fuel opening can be given by screwing the needle M up or down into the nozzle G. The sleeve U is carried upward through the cap of the instrument W and is fitted with a square or other convenient attachment X' to enable it to be rotated and it has at its lower end fingers Y engaging in slots Z formed in the valve E so that its rotational movement can be transmitted to the valve E and the ridge R. By this means the high speed adjustment is made.

A light spring $a$ is provided to keep the various moving parts in contact with one another and may be placed either inside or outside the mixing chamber.

A light cap $b$ can be provided to prevent air leakage through the top of the mixing chamber of the body A but this can be discarded if a means of adjustment from the driver's seat of an automobile is desired. In that event a suitable mechanism can be attached to the square at X'.

A suitable operating lever $c$ is provided for manual operation of the floating valve E should it be desirable to close said valve down or open it farther than the suction would do ordinarily. This lever is forked at its inner end to provide flexible projections $e'$ adjacent to the slot $f$, having ends or tips $d$ which occupy the depressions $g$. When the valve E is rotated by turning the square X' so as to vary the leverage between the air and fuel valves, the tips $e'$ will occupy another pair of depressions $g$ and always the spring of the projections $e'$ will hold the valve E from accidentally rotating while not interfering with its reciprocation.

These projections locate the valve E rotationally while they give ample resistance to any tendency for it to rise from its seat owing to the suction of the engine. Alternatively the location may be effected by serrations $g^1$ in the ridge R as previously explained, the lever P then locating the position of R.

What we claim as our invention, and desire to secure by Letters Patent is:—

1. The combination in a carbureter, of a reciprocating, floating air valve having a depending hollow stem containing a passage for a preliminary air supply, with a fuel nozzle opening within the said stem, a valve adjacent to the preliminary air supply passages coöperating with the said fuel nozzle, and variable leverage means for transmitting the reciprocating movement of the air valve to the fuel valve, substantially as and for the purpose set forth.

2. In a carbureter, the combination of a hollow air valve having a depending hollow stem, with a choke tube therein of Venturi or double conoidal form serving as a passage for a preliminary air supply, a fuel nozzle opening within the said stem adjacent to the narrow orifice of the choke tube, and having an external shape such that axial movement of the choke tube within operative limits does not move the minimum area of the preliminary air passage from a position adjacent to the fuel nozzle, a valve coöperating with the said nozzle, and variable means for transmitting movement of the air valve to the fuel valve.

3. In a carbureter, the combination of a hollow air valve having a depending hollow stem, with a choke tube therein of Venturi or double conoidal form serving as a passage for a preliminary air supply, a fuel nozzle opening within the said stem adjacent to the narrow orifice of the choke tube, and having an external shape such that axial movement of the choke tube within operative limits does not move the minimum area of the preliminary air passage from a position adjacent to the fuel nozzle, a valve coöperating with the said nozzle, the said valve being of cylindrical form and having grooves of variable depth, and variable means for transmitting movement of the air valve to the fuel valve.

4. In a carbureter, the combination of a hollow air valve having a depending hollow stem, with a choke tube therein of Venturi or double conoidal form serving as a passage for a preliminary air supply, a fuel nozzle opening within the said stem adjacent to the narrow orifice of the choke tube, and having an external shape such that axial movement of the choke tube within operative limits does not move the minimum area of the preliminary air passage from a position adjacent to the fuel nozzle, a valve coöperating with the said nozzle, a flange on the said valve spindle, an eccentric cam surface on the air valve, an intermediate lever, or finger, pivoted at one end and having its other end located between the cam on the air valve and the flange on the valve spindle, and means for rotating the air valve.

5. In a carbureter, the combination of a hollow air valve having a depending hollow stem, with a choke tube therein of Venturi or double conoidal form serving as a passage for a preliminary air supply, a fuel nozzle opening within the said stem adjacent to the narrow orifice of the choke tube, and having an external shape such that axial movement of the choke tube within operative limits does not move the minimum area of the preliminary air passage from a position adjacent to the fuel nozzle, a valve coöperating with the said nozzle, a flange on the said valve spindle, an eccentric cam surface on the air valve, an intermediate lever, or finger, pivoted at one end and having its other end located between the cam on the air valve and the flange on the valve spindle, a hollow sleeve encircling the valve spindle and having projections entering grooves in the hollow air valve, and a square or like device, projecting externally of the carbureter body for rotating the said air valve.

6. A carbureter having a mixing chamber connected to a branch forming a passage for air, a hollow air valve closing the opening to the branch and having a depending hollow stem, a choke tube in the said stem of Venturi or double conoidal form, a bearing for the end of the stem having passages connecting said end with the air branch, a fuel nozzle connecting the interior of the stem with a fuel float chamber, being of such shape that, coöperating with the choke tube, pressure in the stem of the air valve under abnormal conditions is reduced, and variable means for transmitting movement of the air valve to the fuel valve.

7. In a carbureter, the combination of a hollow air valve having a depending hollow stem, with a choke tube therein of Venturi or double conoidal form serving as a passage for a preliminary air supply, a fuel nozzle opening within the said stem adjacent to the narrow orifice of the choke tube, and having an external shape such that axial movement of the choke tube within operative limits does not move the minimum area of the preliminary air passage from a position adjacent to the fuel nozzle, a valve coöperating with the said nozzle, variable means for transmitting movement of the air valve to the fuel valve, and a hand lever connected to the air valve so that it may be moved independently of the engine actuation without preventing its rotation.

8. In a carbureter, the combination of a rotatable air valve having a depending hollow stem containing a passage for the preliminary air supply, with a fuel nozzle opening within the said stem, a fuel valve adjacent to the preliminary air supply passages coöperating with the said fuel nozzle, means for rotating the air valve so as to vary the leverage of the transmission mechanism from the air valve to the fuel valve, and a forked hand lever having flexible projections engaging with recesses in the exterior surface of the air valve so that it can be reciprocated without accidental rotation.

In testimony whereof we affix our signatures in presence of two witnesses.

ROBERT WELLESLEY ANTONY BREWER.
GEORGE HERBERT JONES.

Witnesses:
HERBERT D. JAMESON,
C. P. LIDDON.